3,118,728
NITROSO-MANGANESE TETRACARBONYL
Thomas H. Coffield, Farmington, Mich., assignor to Ethyl Corporation, New York, N.Y., a corporation of Virginia
No Drawing. Filed Jan. 28, 1959, Ser. No. 789,471
14 Claims. (Cl. 23—14)

This invention relates to a new nitroso manganese carbonyl compound and methods for its preparation.

An object of this invention is to provide the new compound nitroso manganese tetracarbonyl. Another object is to provide methods for preparing the new compound. Additional objects will become apparent from the description and claims which follow.

According to the invention, nitroso manganese tetracarbonyl is prepared by reacting a manganese carbonyl compound with a nitrosylating agent.

The reaction between a manganese carbonyl compound and a nitrosylating agent can be carried out under anhydrous or aqueous conditions or in the presence of an organic solvent. When using an organic solvent, polar solvents such as higher boiling ethers, are preferred.

Typical organic solvents are high-boiling saturated hydrocarbons such as n-octane, n-decane and other paraffinic hydrocarbons having up to about 20 carbon atoms such as eicosane, pentadecane and the like. Also applicable are aromatic solvents such as benzene, toluene, benzyl alcohol, benzaldehyde, anthracene, mesitylene and the like. Ether solvents which may be employed include ethyl octyl ether, ethyl hexyl ether, the dimethyl ether of diethylene glycol, the dibutyl ether of diethylene glycol, the monomethyl ether of ethylene glycol and the like. Ester solvents which may be employed include pentyl butanoate, ethyl decanoate, ethyl hexanoate and the like. Silicone oils such as the dimethyl polysiloxanes, methylphenyl polysiloxanes, di-(chlorophenyl) polysiloxanes, hexapropyl disilane and diethyldipropyldiphenyldisilane may also be employed. Other ester solvents which may be employed are those derived from succinic, maleic, glutaric, adipic, pimelic, suberic, azelaic, sebacic and pinic acids. Specific examples are di-(2-ethylhexyl) adipate, di-(2-ethylhexyl) azelate, di-(2-ethylhexyl) sebacate, di(methylcyclohexyl) adipate and the like.

The nitrosylating agent can be any one of a broad class of compounds capable of displacing carbon monoxide from the manganese carbonyl reactant to form the desired nitrosyl manganese carbonyl compound. Typical examples of such agents are nitric oxide, an alkali metal nitrite such as sodium or potassium nitrite, or a nitroso-substituted aromatic compound such as N-methyl-N-nitroso-p-toluene sulfonamide.

The reaction may be carried out over a temperature range between about 25 to about 150° C. A preferred temperature range is from about 25 to about 50° C. In this range, the high yields of product obtained are accompanied by a minimum of undesirable side reactions.

The manganese carbonyl reactant may be either dimanganese decacarbonyl or an alkali metal-manganese-pentacarbonyl. Typical alkali metal-manganese-pentacarbonyls are potassium manganese pentacarbonyl, sodium manganese pentacarbonyl, rubidium manganese pentacarbonyl, and cesium manganese pentacarbonyl. The alkali metal-manganese-pentacarbonyl compounds form a preferred class of reactants since their use results in a smooth reaction giving a high yield of nitrosylated product.

The process may be conducted at atmospheric pressure or at higher pressures. Pressures in excess of 100 p.s.i.g. are not normally employed for economic reasons. Higher pressures such as 500 p.s.i.g. can be used, however.

Typical preparative methods are set forth by way of the following examples:

Example I

Twelve parts of manganese carbonyl were converted to the sodium salt by reaction with 200 parts of a one percent sodium amalgam in 133 parts of tetrahydrofuran. The supernatant tetrahydrofuran-sodium manganese pentacarbonyl composition, conatined in a reaction vessel equipped with stirring means and means for maintaining the contents in an inert atmosphere of nitrogen, was reacted with agitation at 10° C. with a solution containing 14 parts of N-methyl-N-nitroso-p-toluene sulfonamide in 22 parts of tetrahydrofuran. The color of the solution turned red and slowly darkened and a gas was slowly evolved. The gas was collected and identified as containing only carbon monoxide and nitrogen. The mixture was stirred for one-half hour and then distilled under vacuum with all the distillate being removed. The distillate was collected at the temperature of Dry Ice. The tetrahydrofuran was removed from the distillate via a packed column at slightly reduced pressure and a temperature of 30°. The deep-red residual liquid which remained was distilled through a micro column to yield a deep-red liquid boiling at 27° at a pressure of 11 millimeters. Infra-red analysis of this liquid showed the characteristic metal carbonyl band and a nitrosyl band. This manganese nitrosyl carbonyl, $NOMn(CO)_4$, on analysis was found to contain 28 percent manganese (calculated, 27.9 percent).

Example II

Fifty parts of manganese carbonyl are placed in a tube reactor with means for passing material through the tube. The tube, which contains the manganese carbonyl, is equipped with means for heating. The tube reactor is flushed slowly with nitrogen until all air has been expelled, and then the reaction zone is heated to 50° C. Nitric oxide is then passed through the reactor and over the hot manganese carbonyl. The nitroso manganese tetracarbonyl, which is formed as a red liquid, is carried along the tube and into a condensing apparatus where it is obtained in good yield.

Example III

One hundred parts of sodium manganese pentacarbonyl is prepared in 500 parts of tetrahydrofuran by allowing 50 parts of manganese carbonyl to react with excess one percent sodium amalgum. The sodium manganese pentacarbonyl solution is decanted from the sodium amalgam and then treated with 100 parts of sodium nitrite in 500 parts of water. This is followed by the addition of 100 parts of acetic acid. The nitroso manganese tetracarbonyl formed is flash-distilled from this mixture and finally separated by distillation through a small fractionating column. The material is isolated in good yield as a volatile red liquid having a boiling point of 27° C. at 11 millimeters.

Example IV

One hundred parts of sodium manganese pentacarbonyl are prepared as described above and placed in a small pressure vessel. Nitric oxide is fed into the vessel with stirring and this addition continued until a significant pressure increase is noted. The pressure is not allowed to go above 100 p.s.i.g. The reaction mixture is then flash-distilled and the nitroso manganese tetracarbonyl is isolated by fractional distillation as a volatile red liquid in good yield.

The compound, nitroso manganese tetracarbonyl, has considerable utility in forming metallic mirrors. The mirrors are formed through thermal decomposition of the compound which results in the laying down of a metallic mirror of manganese. These metallic mirrors furnish protection against corrosion when they are applied to base materials that are susceptible to corrosion. Also, they may be used to produce a decorative effect on the coated materials.

Nitroso manganese tetracarbonyl can be deposited on glass, glass cloth, resins and other insulating supports and the resultant metal-coated materials can be used as conductors and insulating tapes for electrical applications. When forming the metallic mirrors by thermal decomposition of nitroso manganese tetracarbonyl, it is preferable to use inert gases such as argon as protecting or covering gases in order to reduce oxidation to a minimum.

When forming the metallic coating, the objects to be coated are placed in an evacuated container along with a small quantity of nitroso manganese tetracarbonyl. A small quantity of an inert gas such as argon may be placed in the container in order to prevent oxidation during the mirror-forming process. The container and contents are then heated to a temperature up to about 500° C. for approximately 30 minutes after which the container is cooled and opened. The surface of the objects will be found to be plated uniformly with a metallic layer of manganese.

The time required for coating will vary inversely with respect to the temperature used for the coating operation. Thus, if a relatively high temperature is used for the coating process, the time required will be relatively short. On the other hand, if the coating temperature is relatively low, a longer time will be required to form an adherent coating of manganese metal.

The compound, nitroso manganese tetracarbonyl, is soluble in inorganic solvents, including petroleum products, such as gasoline, distillate products such as furnace oils, residual fuel oils and lubricants such as crank case oils, transmission oils and chassis lubricants. Since the compound shows oxidative instability, it should be handled with precautions to exclude air. When such precautions are taken, it can be used to improve the combustion of hydrocarbon fuels such as gasoline, furnace oils, etc.

This application is a continuation-in-part of application Serial No. 645,674, filed March 13, 1957, now Patent No. 2,967,087.

I claim:

1. The compound, nitroso manganese tetracarbonyl, having the formula $NOMn(CO)_4$.

2. The method for preparing the compound nitroso-manganese-tetracarbonyl, comprising reacting a manganese carbonyl compound selected from the class consisting of dimanganese decacarbonyl and alkali metal manganese pentacarbonyls with a nitrosylating agent selected from the class consisting of nitric oxide, alkali metal nitrites and N-methyl-N-nitroso-p-toluene sulfonamide.

3. The process of claim 2 wherein the manganese carbonyl compound is an alkali metal manganese pentacarbonyl.

4. The process of claim 3 wherein the alkali metal manganese pentacarbonyl is sodium manganese pentacarbonyl.

5. The process of claim 2 wherein the reaction is carried out in the presence of an organic solvent.

6. The process of claim 5 wherein the reaction is carried out in the presence of tetrahydrofuran solvent.

7. The method for preparing the compound nitroso-manganese tetracarbonyl, having the formula $$NOMn(CO)_4$$

comprising reacting a manganese carbonyl compound selected from the class consisting of dimanganese decacarbonyl and alkali metal manganese pentacarbonyls, with N-methyl-N-nitroso-p-toluene sulfonamide.

8. The process of claim 7 wherein the reaction is carried out in the presence of an organic solvent.

9. The process of claim 8 wherein the organic solvent is tetrahydrofuran.

10. The method for preparing the compound nitroso-manganese tetracarbonyl, having the formula $$NOMn(CO)_4$$

comprising reacting an alkali metal manganese pentacarbonyl with N-methyl-N-nitroso-p-toluene sulfonamide.

11. The process of claim 10 wherein the alkali metal manganese pentacarbonyl is sodium manganese pentacarbonyl.

12. The process of claim 10 wherein the reaction is carried out in the presence of an organic solvent.

13. The process of claim 12 wherein the organic solvent is tetrahydrofuran.

14. The method of preparing the compound nitroso-manganese tetracarbonyl, having the formula $$NOMn(CO)_4$$

comprising reacting sodium manganese pentacarbonyl with N-methyl-N-nitroso-p-toluene sulfonamide in tetrahydrofuran.

References Cited in the file of this patent

Hieber: FIAT Review of German Science, 1939–1946, "Inorganic Chemistry," 1948, vol. II, pp. 128–130.

Karrer: "Organic Chemistry," 2nd English Edition, 1946, pp. 54, 126 and 281.

Thorpe et al.: "Thorpe's Dictionary of Applied Chemistry," 4th Edition, 1940, vol. IV, p. 152.

Remy et al.: "Treatise on Inorganic Chemistry," 1956, vol. II, pp. 351–358.

Sidgwick: "Chemical Elements and Their Compounds," 1950, vol. II, pp. 1423–1425.

Wender et al.: "Journal of the American Chemical Society," vol. 74, pp. 1216–1219, 1952.

Mond et al.: "Journal of the Chemical Society," vol. 121, pp. 32–35 (1922).

Brimm et al.: J.A.C.S., vol. 76, 1954, pp. 3831–34.